March 31, 1964 P. KONIEWIEZ ETAL 3,127,248
CATALYST TUBE ASSEMBLY
Filed June 29, 1961
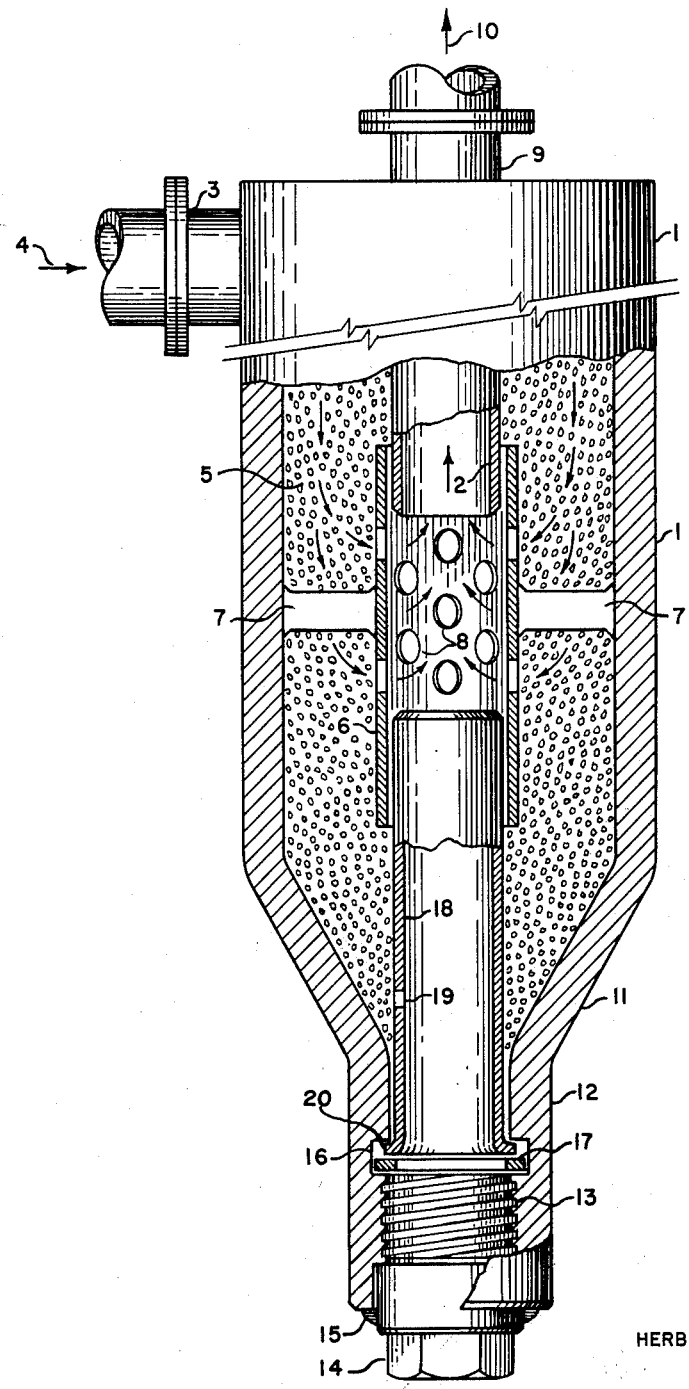
PAUL KONIEWIEZ
HERBERT C. MORGENSTERN
INVENTORS
BY J. T. Chaloty
AGENT

3,127,248
CATALYST TUBE ASSEMBLY
Paul Koniewiez, now by change of name Paul Korwin, 75—10 Kissena Blvd., Flushing 67, N.Y., and Herbert C. Morgenstern, 84 Rivervale Road, Westwood, N.J.
Filed June 29, 1961, Ser. No. 120,556
5 Claims. (Cl. 23—288)

This invention relates to apparatus for use in carrying out catalytic reactions at elevated temperature and pressure. Typical of these is the reaction of fluid hydrocarbons with steam to yield a process gas stream containing hydrogen and carbon monoxide. This process, known as reforming, is widely employed to produce a synthesis gas for eventual conversion to ammonia or methanol.

The reaction is carried out in a plurality of cylindrical metallic tubes which are packed with particles of solid catalytic material. The tubes are usually vertically oriented inside a reformer furnace. In operation, the process gas stream consisting of a mixture of steam and fluid hydrocarbon is passed through the tubes at an elevated pressure. An elevated temperature is also maintained by means of combustion burners positioned inside the furnace, typically as shown in FIGURE 3 of U.S. Patent 2,707,147. It should be noted that the reaction tubes are preferably not disposed with upper and lower ends external to the furnace as shown in FIGURE 3 of U.S. 2,707,147. Instead, due to thermal expansion, sealing problems and other such considerations, the tubes are usually vertically suspended so as to hang freely within the furnace. Gas passage is obtained by providing an inner concentric gas duct inside the main tube, with solid catalyst being disposed in the annular space between the gas duct and the tube. Thus, process gas flow takes place typically as a downward flow in the annular passage, an inward flow through lower openings in the gas duct, and an upward flow through the inner gas duct. Catalytic reaction takes places only in the annular space, and the gas stream in the inner duct will thus consist primarily of the desired product synthesis gas, which is mainly carbon monoxide and hydrogen. It will be evident that this flow sequence may be reversed, with downward flow of the feed gas mixture through the central duct and upward flow in the annular space. Due to unfavorable thermal gradients, possibility of hydrocarbon cracking, etc., this alternate is usually not adopted in practice, except where the feed gas mixture is very low in temperature and extra preheating is required.

Since gas inlet and outlet both take place at the upper end of the tube in the arrangement described supra, an opening at the lower end of the tube is not required for process gas flow. However, a means of opening the reformer tube at its lower end should always be provided, for several reasons. A principal reason for providing such means to open the lower end of tube is that the catalyst charge must periodically be replaced with fresh catalyst. From a practical viewpoint, it is not desirable to replace spent catalyst by dismantling and removing the tube from the furnace, since these tubes are often 30 feet in length or longer. In addition, after a period of service in the hot furnace atmosphere the metal tube wall may become brittle, and thus the tube may be damaged or cracked by excessive handling. It has been found that a far more efficient arrangement is one in which the tube is kept in place and spent catalyst is removed from the tube through a lower outlet. Such an arrangement also facilitates refilling the tube with fresh catalyst. In this case, the tube is first filled with water. Solid fresh catalyst is then gradually added, and slowly sinks down through the water. The displaced water is bled off through a valve attached to the lower opening, to prevent overflow of displaced water from the tube into the furnace. In this way, damage to the catalyst is prevented, since a free fall of up to 30 feet would serve to shatter the catalyst and produce excessive amounts of catalyst powder. In addition, free fall of the catalyst would thus also tend to result in blockage of the gas flow passages defined by void spaces between catalyst particles.

Various types of removable closure means have been suggested and utilized for this purpose in the past. A widely used arrangement consists merely of a lower neck which terminates with a flange. A blank companion flange is bolted to this flange, with a heat-resistant gasket being provided between the flanges as a gas seal. Another type of assembly employs a plug or bolt which is screwed into inner threads in the neck, so as to exert a compressive force against a seal plug. The seal plug in this case may be made of a softer metal, or may be an element with a smoothly machined contact surface which provides compression sealing against gas flow.

These arrangements of the prior art are widely employed; however, it has been found that such arrangements are objectionable for various reasons. A principal objection is that some leakage will always occur, due to differential thermal expansion which takes place when these assemblies are heated to actual operating temperatures. Differential expansion may occur because of dissimilar thermal expansion coefficients, and also since the actual temperatures of the various individual elements in the assembly may differ even though operating equilibrium is attained. Tightness of bolted joints depends upon maintenance of high bolt stresses to compress gaskets. Exposure of such assemblies to high temperatures results in eventual relaxation of these stresses due to creep, which thus permits leakage past the gasket.

This leakage, regardless of the specific causative factor, always results in a loss of process gas. The gas which leaks out of the tube is immediately burned in the furnace and becomes part of the flue gas stream. In addition, such leakage causes localized burning at the leak point and thus provides localized overheating which further aggravates the problem.

Another objection to such arrangements of the prior art is that mechanical problems often arise when a seal plug under compression is the sealing means. In this case, the threaded joint must be drawn up tightly and galling or seizing of the metal threads or neck plug often occurs. Positive sealing is often not obtained due to inclusion of particles in the machined threads or between the plug and seat, such as particles of metal, carbon, or powdered catalyst. Finally, the flanged type of closure is objectionable since it is quite cumbersome and expensive, and the seal gasket must usually be replaced with a fresh gasket each time the tube is opened for inspection or catalyst change. The flanges may warp to some extent due to exposure to the high temperatures. Refacing of flanges is often required, and high bolt stresses are needed in order to properly seat the gaskets.

In the apparatus of the present invention, these various problems and difficulties of the prior art have been eliminated. The lower end of the outer tube is preferably converged with a conical reducer section which terminates in a neck section provided with straight internal threading and an undercut above the threading. A sleeve is provided which slides up through the neck to engage the inner tube so as to prevent solid catalyst from passing into the inner tube from the annular section. This sleeve is provided with an outwardly projecting lower lip which engages the undercut. A snap ring is then included in the undercut below the sleeve lip, so as to retain the sleeve in position. A plug with straight thread is then screwed in the neck, and back welded with only a small seal weld to prevent gas leakage. Thus, in order to inspect the tube or replace catalyst, a simple procedure is followed. The seal weld is readily chipped or cut off, and the plug is screwed out of the neck. The snap ring is removed from the undercut, and the sleeve is then pulled down out of the tube. The solid catalyst will then readily pass down out of the tube and may be removed without bridging. The shape of the conical reducer results in minimum resistance to catalyst flow and prevents bridging.

It should be understood that a principal advantage of this tube assembly lies in the improved service which is obtained under operating conditions. When assembled, the stresses due to internal pressure are primarily transmitted by the threads. Thus, the welding is practically stress free and acts only as a gas seal. Therefore, the weld is small and may be readily cut off and replaced many times in actual service. Under the high temperature service which is encountered, this assembly is very reliable and provides positive and absolute sealing against leakage and loss of process gas.

It should be noted that this assembly does not require extreme tension or tightening of the threaded units. The reason for this is that the threaded plug is not intended either to provide absolute gas seal or to produce compression for a gasket or plug seal. Instead, the threaded plug in the assembly of the present invention performs an entirely different function. The threading merely serves to hold the plug in position by opposing the internal pressure which is thus transmitted against the neck. Thus, the plug does not act as a gas seal but rather is a fixed element which does not move due to the action of internal pressure inside the tube and provides retention against the action of this internal pressure. Since no positive gas sealing is required, straight threading is employed. Thus, the thread galling or seizing which commonly occurs when tapered threading is employed for gas sealing as well as pressure retention, is avoided in the present invention. Some gas leakage past the threads thus take place, however, it should be obvious that the gas leakage will be readily and positively retained by the small seal weld. There is no possibility of rupture of the seal weld since the area on which the gas pressure acts is extremely small.

It is an object of the present invention to provide an improved apparatus assembly for catalytic reforming of hydrocarbons.

Another object is to provide an apparatus which maintains an absolute seal against gas leakage at elevated temperature.

A further object is to provide an apparatus which facilitates removal and replacement of spent catalyst.

An additional object is to provide an improved closure for reformer tubes operating under elevated temperature and pressure service conditions.

Still another object is to provide an apparatus for catalytic hydrocarbon reforming in which positive closure is obtained under service conditions.

Still a further object is to provide a reformer tube assembly for catalytic hydrocarbon reforming which may be readily and simply opened at its lower end for catalyst replacement, and thereafter positively and completely resealed against pressure and gas leakage.

These and other objects and advantages of the apparatus of the present invention will become evident from the description which follows. Referring to the figure, which presents a preferred embodiment of the present invention, reformer tube 1 is shown with inner coaxially-aligned return tube 2. Upper inlet 3 is provided for admittance of inlet gas stream 4 into the annular space between tubes 1 and 2. This space is filled with catalyst 5. Tube 1 is maintained at an elevated internal temperature by external heating means, not shown. Gas stream 4 is passed into tube 1 at elevated pressure, and while passing downwards in contact with catalyst 5 the desired catalytic reaction or conversion takes place.

In this preferred embodiment of the present invention, inner tube 2 extends down into outer concentric collar 6, which is also vertically oriented and coaxially aligned and maintained in position by brackets 7 which are attached to the inner wall of tube 1. Collar 6 is provided with openings such as 8, through which the converted gas stream passes inwards. The gas stream then flows upwards through inner tube 2, which extends to upper outlet 9. The converted gas finally passes via 10 to further processing as desired.

The lower end of tube 1 is provided with a conical reducer section 11, which extends to a lower closure neck 12. Neck 12 is the section of tube 1 in which the novel closure of the present invention is attained. Thus, neck 12 is provided with internal straight threading section 13. Threading 13 may be any type of straight square form threading. Thus, it will be understood that threading 13 may be any type of thread having a constant root diameter and O.D. diameter over its length, but preferably having a square form or a form with slight taper on the flanks. In any case, threading 13 does not have any significant amount of taper, and consequently does not achieve any sealing or compression effect. Thus threading 13 is solely a retention thread to prevent movement of the plug 14 which is screwed into neck 12. It will be noted that a slight taper profile may be provided to facilitate machining of the plug. As mentioned supra, plug 14 is not intended for sealing purposes, and therefore is only hand-tightened or at most will be positioned with only slight torque. Seal weld 15 is formed to provide positive sealing against gas flow between plug 14 and neck 12. The material of the plug and the neck must obviously be suitable to withstand high temperatures and to retain adequate physical strength at operating temperature and must be capable of exposure to both furnace atmospheres and the gases within the tubes. Chrome-nickel steels or other materials known and available to those versed in the art may be employed. Preferably the materials used should be sufficiently dissimilar in composition or metallographic structure so as to further minimize possible seizure between the elements and preferably the plug should be of a material having a coefficient of thermal expansion not greater than, and preferably slightly less than the material of the neck.

The inside of neck 12 above threading 13 is provided with undercut 16, which serves to hold snap ring 17 in position. Ring 17 retains sleeve 18 in place, by contact with the outwardly extending lower lip 20 of sleeve 18. Sleeve 18 prevents catalyst from passing into neck 12 or inner tube 2, and also has an additional function of facilitating water removal when fresh catalyst is added to the empty tube which has been filled with water. Thus sleeve 18 is also provided with water drain hole 19. It should be understood that in practice catalyst 5 consists of solid particles which are of larger size than the openings 19 and 8, and thus the catalyst does not pass through these openings.

Returning now to plug 14, it will be evident that the retention of the closure plug against movement due to pressure is by means of threads 13. Since these threads are straight threads rather than tapered, and since severe tightening of the threaded plug 14 in the neck 12 is not required and is in fact to be avoided, galling or seizing of the threads 13 is avoided and generally will not occur. However, a certain amount of sticking may occur due to the high temperature service. Thus, it will be advisable in most cases to coat the threads 13 with dry molybdenum sulfide powder, graphite or other suitable lubricant, to insure smooth action when plug 14 is removed for purposes of catalyst replacement. As mentioned supra, process gas will penetrate through threads 13. However, gas leakage is prevented by gas seal weld 15. Practically no stress is applied on weld 15, since the available gas pressure exerts a force only on the small net circular area equivalent to the tiny spacing between the plug 14 and the inner surface of the neck 12.

During normal operation of this reformer tube assembly, the activity of catalyst mass 5 will gradually decline. Finally a point is reached at which the catalyst is essentially spent, and must be replaced. Sometimes catalyst must be replaced due to damage resulting from process upsets. The improved closure and related apparatus elements of the present invention provide a simple yet effective means for accomplishing the catalyst change. Thus, the gas flow through the tube is stopped and the furnace shut down. Seal weld 15 is cut away and plug 14 is screwed out of neck 12. Snap ring 17 is removed using pliers or other convenient tool. Finally, sleeve 18 is taken out through neck 12. In most cases sleeve 18 will be slidingly fitted in neck 12. However, catalyst powder formed during service will usually pack down and cake up between sleeve 18 and neck 12. Thus, openings or notches, not shown, may be provided in the lower part of sleeve 18, to facilitate pulling this element down out of neck 12. After sleeve 18 is removed, the spent catalyst will pas down through neck 12 and out of tube 1.

The empty tube 1 must now be recharged with fresh catalyst, after sleeve 18 is re-inserted together with snap ring 17. As mentioned supra, the fresh catalyst cannot be simply poured in at the top of tube 1 via inlet 3, because of excessive catalyst fracturing and shattering due to free fall down through the tube. Instead, a valved fitting is screwed into neck 12 or alternatively a rubber coupling leading to a valve may be fitted over neck 12. Tube 1 is now filled with water. Then the fresh catalyst is added via 3, and simultaneously the water is bled off through the valve. Drain hole 19 serves to facilitate this drainage from tube 1. Thus, free fall of the catalyst is prevented. Overflow of the water into the furnace as catalyst is added must be avoided, due to the possibility of damaging or weakening the refractory surfaces inside the furnace. After the charge of fresh catalyst has been added, and the water completely drained from the tube, the valved fitting or rubber coupling is removed. Then the plug closure 14 is screwed into place and gas seal weld 15 is applied. The reformer tube assembly is now ready for further high temperature service.

It should be noted that weld 15 performs the primary function of sealing against gas flow. It will be understood that weld 15 of course performs the additional incidental function of serving to attach plug 14 to neck 12 by positive metallic contact. However, this attachment function is not analogous to the typical welding practice where the weld serves as a structural member and possesses strength to resist tension or shear. Instead, the weld 15 is purposely intended to be weak in this respect since all structural strength for the closure is provided by threading 13. Thus, weld 15 is easily cut way and replaced with fresh welding many times, without affecting the structural integrity of plug 14 or neck 12. The plug may be provided wtih a collar, not shown, to provide protection for the threads against overheating due to the welding. Preferably, however, the threading on plug 14 will be recessed relative to the welding interface, as shown on the figure, in order to provide this protection.

Numerous variations within the scope of the present invention will occur to those skilled in the art. Thus, for example, as discussed in detail supra, the direction of process gas flow through the apparatus may be reversed. In this case, the feed gas mixture would be admitted via 9, flow downward through 2, outwards through openings 8, upwards in contact with catalyst 5 in the annular space between tubes 2 and 1, and finally out of the unit via 3 as reformed gas. For reasons mentioned supra, this variation is usually not preferable in practice.

Another modification might consist in providing gas flow openings such as 8 in sleeve 18 or in the lower end of the tube 2. Thus it would be quite feasible, particularly for smaller units, to completely eliminate collar 6. In this case, either tube 2 or sleeve 18 would be of a larger diameter equivalent to the diameter of collar 6, and the two elements 2 and 18 would thus overlap and be concentric as well as coaxially aligned over a portion of their lengths.

Plug 14 may be provided with a recess on the inner face, so as to insure uniform thermal distribution and expansion during startup heating of the facility. In addition, plug 14 could be utilized to serve as a mount for a thermocouple socket. In this case, an axial opening would be drilled through plug 14 to accommodate the socket, which would extend up through ring 17, sleeve 18, and collar 6 to a desired point for temperature measurement. The socket would of course be permanently attached and sealed to plug 14 with a high-strength permanent weld or other such temperature and pressure-resistant attachment. It would even be possible to machine a single combined unit consisting of plug 14 together with a central recess and socket extension leading upwards which would serve to accommodate a thermocouple or other temperature measuring device.

It should be noted that the annular space outside collar 6 and below openings 8 is essentially a void space with respect to gas flow and catalytic conversion. Thus, it may be preferable to fill this space with inert material such as ring packing so as to conserve catalyst. This preliminary filling is of course readily accomplished each time a charge of fresh catalyst is added, by merely inserting the required amount of packing through inlet 3 before the main charge of fresh catalyst is added.

The apparatus of the present invention is applicable to numerous other types of catalytic reactions, such as the catalytic manufacture of ethylene. In addition, the closure concept of the present invention is of course applicable to one pass tube assemblies or at the ends of tubes in a continuous coil of multiple passes through a furnace.

We claim:

1. Catalyst tube assembly with improved lower gas sealing closure for high temperature service, which comprises a vertically oriented cylindrical outer tube, a cylindrical inner tube coaxially aligned within said outer tube, solid catalyst particles disposed in the annular space between said inner tube and said outer tube, gas inlet means at the upper end of said outer tube for passage of process gas into the annular space between said inner tube and said outer tube, said inner tube terminating above the lower end of said outer tube and being provided with an opening at its lower end for inlet of catalytically converted process gas, the upper end of said inner tube terminating at an outlet for removal of converted process gas from the catalyst tube assembly, a closure neck at the lower end of said outer tube, said closure neck being provided with an internal straight thread section, a threaded plug, said plug being screwed into the threaded section of said neck, the threads of said plug being substantially free of compression, and an outer gas sealing weld between said plug and said neck, said gas sealing weld being substantially free of stress and serving to provide sealing against fluid leakage between the threads of said plug and said neck.

2. Apparatus of claim 1, in which said straight thread is a square form thread.

3. Catalyst tube assembly wtih improved catalyst removal and gas sealing means which comprises a vertically-oriented cylindrical outer tube, a cylindrical inner tube coaxially aligned within said outer tube, solid catalyst particles disposed in the annular space between said inner tube and said outer tube, gas inlet means at the upper end of said outer tube for passage of process gas into the annular space between said inner tube and said outer tube, said inner tube terminating above the lower end of said outer tube and being provided with an opening at its lower end for inlet of catalytically converted process gas, the upper end of said inner tube terminating at an outlet for removal of converted process gas from the catalyst tube assembly, a conical reducer section at the lower end of said outer tube, said reducer section extending to a lower closure neck, said closure neck being provided with a lower internal straight thread section and an internal undercut, said undercut being above said thread section, an internal cylindrical sleeve extending upwards from within said closure neck, said sleeve being coaxially aligned with said inner tube and having a diameter equal to that of said inner tube, a perforated cylindrical external collar vertically suspended within said outer tube and extending between the upper end of said sleeve and the lower end of said inner tube, said perforations being of small magnitude whereby passage of solid catalyst into said inner tube is prevented, said sleeve being provided with a lower lip extending outwardly, said lip having an outer diameter smaller than the internal diameter of the internal straight thread section of said closure neck, a snap ring positioned in said internal undercut below said lip, a threaded plug, said plug being screwed into the threaded section of said neck, and an outer gas sealing weld between said plug and said neck.

4. Apparatus of claim 3, in which an opening is provided in said sleeve above the section of said sleeve adjacent to said neck, whereby drainage of water from said outer tube and through said neck is facilitated.

5. Apparatus of claim 3, in which said straight thread is a square form thread.

References Cited in the file of this patent

UNITED STATES PATENTS

| | | |
|---|---|---|
| 1,246,164 | Ruegger | Nov. 13, 1917 |
| 1,902,862 | Kerr et al. | Mar. 28, 1933 |
| 1,958,582 | Kerr et al. | May 15, 1934 |
| 2,203,840 | Perkins | June 11, 1940 |
| 2,289,271 | Kane et al. | July 7, 1942 |
| 2,634,194 | Nebeck | Apr. 7, 1953 |
| 2,677,601 | Ruth | May 4, 1954 |

UNITED STATES PATENT OFFICE
CERTIFICATE OF CORRECTION

Patent No. 3,127,248                             March 31, 1964

Paul Koniewiez, now by change of
name, Paul Korwin et al.

It is hereby certified that error appears in the above numbered patent requiring correction and that the said Letters Patent should read as corrected below.

In the grant, lines 1 to 3, for "Paul Koniewiez, now by change of name, Paul Korwin, of Flushing, New York, and Herbert C. Morgenstern, of Westwood, New Jersy," read -- Paul Koniewiez, now by change of name, Paul Korwin, of Flushing, New York, and Herbert C. Morgenstern, of Westwood, New Jersey, assignors to Chemical Construction Corporation, of New York, N. Y., a corporation of Delaware, --; line 12, for "Paul Korwin and Herbert C. Morgenstern, their heirs" read -- Chemical Construction Corporation, its successors --; in the heading to the printed specification, lines 3 to 5, for "Paul Koniewiez, now by change of name Paul Korwin, 75-10 Kissena Blvd., Flushing 67, N. Y., and Herbert C. Morgenstern, 84 Rivervale Road, Westwood, N. J." read -- Paul Koniewiez, now by change of name Paul Korwin, Flushing, N. Y., and Herbert C. Morgenstern, Westwood, N. J., assignors to Chemical Construction Corporation, New York, N. Y., a corporation of Delaware --.

Signed and sealed this 4th day of August 1964.

(SEAL)
Attest:

ERNEST W. SWIDER                         EDWARD J. BRENNER
Attesting Officer                        Commissioner of Patents